US012777056B2

(12) United States Patent
Duncan et al.

(10) Patent No.: US 12,777,056 B2
(45) Date of Patent: Oct. 27, 2026

(54) METHODS AND SYSTEMS FOR NETWORK ANOMALY DETECTION AND REMEDIATION

(71) Applicant: T-Mobile Innovations LLC, Overland Park, KS (US)

(72) Inventors: Troy Duncan, Bellevue, WA (US); Jyot Kumar, Sammamish, WA (US); Bhanu Prasad, Bellevue, WA (US); Shrustishree Sumanth, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 33 days.

(21) Appl. No.: 18/951,437

(22) Filed: Nov. 18, 2024

(65) Prior Publication Data

US 2026/0142992 A1 May 21, 2026

(51) Int. Cl.
*H04L 9/40* (2022.01)

(52) U.S. Cl.
CPC .................................. *H04L 63/1425* (2013.01)

(58) Field of Classification Search
CPC .................................................... H04L 63/1425
USPC ............................................................ 726/26
See application file for complete search history.

(56) References Cited

U.S. PATENT DOCUMENTS 11,593,639 B1 * 2/2023 Garg .................. G06F 18/2415
12,526,291 B2 * 1/2026 Dutta .................. H04L 63/1416
12,527,526 B2 * 1/2026 Payling ................ A61B 5/7264
2014/0019194 A1 * 1/2014 Anne ................ G06Q 10/0635 705/7.28
2014/0200953 A1 * 7/2014 Mun ...................... G06Q 10/04 705/7.28
2015/0026027 A1 * 1/2015 Priess .................... G06Q 10/04 705/35
2015/0339263 A1 * 11/2015 Abu El Ata ............ G06F 17/10 703/2
2019/0297487 A1 * 9/2019 Muñoz Sanchez ... H04L 67/535
2020/0175439 A1 * 6/2020 Abu El Ata ....... G06Q 10/0635
2021/0326785 A1 * 10/2021 Mcburnett ......... G06Q 30/0185
2022/0207442 A1 * 6/2022 Sarkar ....................... G06N 3/09
2024/0161000 A1 * 5/2024 Zasman ................. G06N 10/00
2025/0141733 A1 * 5/2025 Mysore ................. H04L 41/069
2025/0225234 A1 * 7/2025 Manickam ............ G06F 21/554
2026/0017593 A1 * 1/2026 Sekar ................ G06Q 10/0635

OTHER PUBLICATIONS

Fan (Fred) Lin; Hardware Remediation at Scale; IEEE:2018; pp. 14-17.*

* cited by examiner

*Primary Examiner* — Monjur Rahim

(57) ABSTRACT

A method comprising training a predictive model system using historical data describing prior incidents that occurred in the communication network, wherein the historical data comprising prior incident data, prior subscriber usage data associated with the prior incidents, and prior performance data associated with the prior incidents, detecting an anomaly event based on current network parameters, wherein the anomaly event is an event or state occurring across one or more of network elements in the communication network that is indicative of a future incident that is likely to occur in the communication network, and instructing a remediation action to perform based on the anomaly event.

20 Claims, 8 Drawing Sheets

METHODS AND SYSTEMS FOR NETWORK ANOMALY DETECTION AND REMEDIATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A core network is a central part of a telecommunication service provider's infrastructure that manages key functions, such as, for example, call control, data routing, mobility management, and service delivery for end users and subscribers. An online charging system (OCS) is a system communicatively coupled to the core network and is responsible for real-time metering and monitoring of subscriber usage of the telecommunication services, ensuring the subscribers are charged based on their usage (e.g., voice, data, messaging, etc.) and account status. Both the core network and the OCS have various applications and functions, such as managing sessions, enforcing policies, and processing data traffic. The OCS continuously monitors and meters subscriber usage from core network elements, ensuring that usage is accounted for in real-time and that services are either authorized or denied according to prepaid or postpaid subscription plans.

SUMMARY

In an embodiment, a method for network anomaly detection and network error prevention in a communication network is disclosed. The method comprises maintaining, by an application executing at a computer system, historical data describing a history of prior network incidents occurring in the communication network, in which the historical data includes subscriber usage data associated with each of the prior network incidents and performance data indicative of one or more behaviors of at least one of one or more applications, one or more operating systems, and one or more hardware network elements in the communication network before a respective prior network incident, and collecting, by the application, anomaly-to-incident mappings indicating a predefined pattern of events across one or more of the applications, the operating systems, and the hardware network elements in the communication network are indicative of a future incident. The method further comprises inputting, by the application, the historical data and the anomaly-to-incident mappings into a predictive model system to train the predictive model system to detect an anomaly event indicative of a current network anomaly occurring in the communication network, providing, by the application, current network parameters as input into the predictive model system to determine whether the anomaly event is occurring in the communication network, detecting, by the application using an anomaly application of the predictive model system, the anomaly event in response to providing the current network parameters as the input into the predictive model system, determining, by the application using a causation and impact application of the predictive model system, a root cause and network impact of the anomaly event, and instructing, by the application, performance of a remediation action based on the anomaly event, the root cause of the anomaly event, and the network impact of the anomaly event.

In another embodiment, a system is disclosed. The system comprises a non-transitory memory, a processor communicatively coupled to the memory, and an application stored at the memory. The memory is configured to store current subscriber usage data of telecommunication services provided to subscriber user equipment (UEs) by a core network and an online charging system over a predefined period of time, and store current network parameters describing a behavior or state of at least one of applications, operating systems, or hardware network elements while providing the telecommunications services to the subscriber UEs over the predefined period of time. The application, when executed by the processor, causes the processor to be configured to obtain, using an anomaly application of a predictive model system, anomaly event data describing an anomaly event based on the current network parameters and the current subscriber usage data, in which the anomaly event is a series of states or events occurring across one or more of the applications, the operating systems, or the hardware network elements that is indicative of a future incident that is likely to occur while providing the telecommunications services to the subscriber UEs, determine, using a causation and impact application of the predictive model system, a root cause parameter describing a root cause of the anomaly event, and instruct, using a remediation application of the predictive model system, a remediation action to perform based on the anomaly event data and the root cause parameter, wherein the remediation action comprises modifying resources used to provide the telecommunications services to the subscriber UEs.

In yet another embodiment, a method is disclosed. The method comprises training, by an application executing at a computer system in a communication network, a predictive model system using historical data describing prior incidents that occurred in the communication network, in which the historical data comprising prior incident data, prior subscriber usage data associated with the prior incidents, and prior performance data associated with the prior incidents, detecting, by the application using an anomaly application of the predictive model system, an anomaly event based on current network parameters, in which the anomaly event is an event or state occurring across one or more of network elements in the communication network that is indicative of a future incident that is likely to occur in the communication network, and instructing, by the application using a remediation application of the predictive model system, a remediation action to perform based on the anomaly event, in which the remediation action comprises modifying a task performed by the one or more network elements to prevent the future incident.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
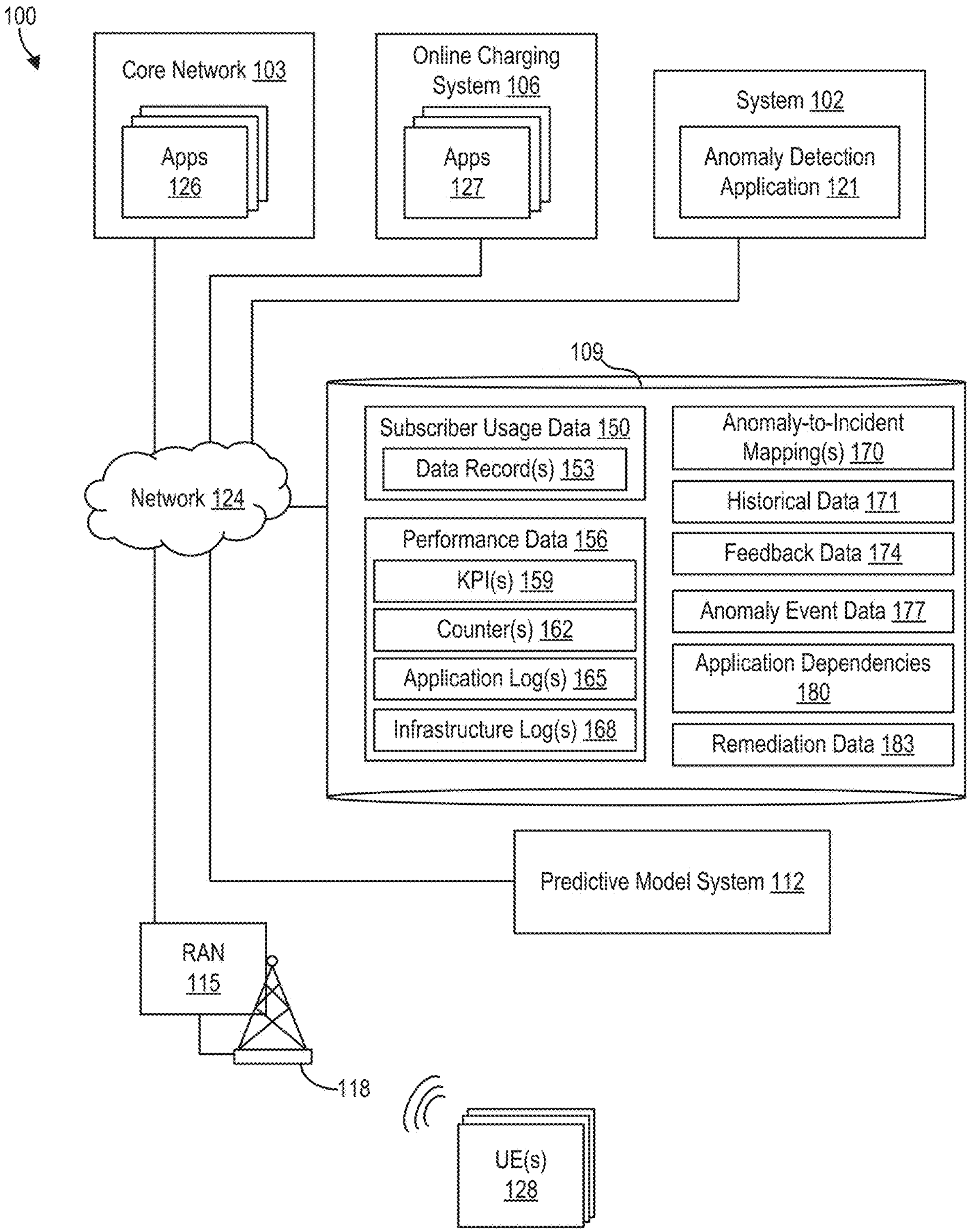
FIG. 1 is a block diagram of a communication network for anomaly detection and remediation according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, the online charging system (OCS) monitors the usage of various functions, modules, and applications across the OCS itself and the core network, for real-time charging and billing purposes. For example, the OCS is responsible for metering subscriber usage of resources, identifying a cost associating with each of these resources, and then charging the customer based on the cost and the usage of the resources. In doing so, the applications at the OCS interact with several other applications within the OCS and the core network for metering subscriber usage.

In particular, the OCS may collect various types of data while metering usage for charging and billing purposes. For example, the OCS may collect usage detail records (UDRs), call data records (CDRs), and/or other data records indicating an amount of voice, data, and/or messaging services consumed by subscriber UEs. The OCS may also collect different types of logs, such as session logs detailing the start and end times of calls or data sessions, as well as session interruptions or handovers, and policy application logs where usage limitations, priorities, or quality of service (QOS) conditions are enforced. In general, the OCS collects an enormous amount of data related to the use of various functions, applications, operating systems, software artifacts, hardware resources/network elements, etc. in a communication network, for the purpose of providing telecommunications services to the end user.

Sometimes, this data may be indicative of an impending or future incident that is likely to occur in the communication network (e.g., across one or more functions, applications, and/or network elements at the core network, OCS, and/or radio access network (RAN)). An incident may refer to a series of one or more events occurring in the communication network that degrades the state of the network (e.g., network congestion, policy misapplication, system instability, etc.) and/or disrupts the services provided to the subscribers (e.g., service denial or interruption, degraded cellular connection, high latency, dropped calls, slow connection, etc.). An incident may not be detected and/or reported by an entity in the communication network (e.g., a network operations center (NOC) or other operator in the network) until a network impact of the incident reaches a certain threshold level.

However, at this stage, the occurrence of the incident may have already significantly degraded the state/condition of the network and/or significantly disrupted the services provided to the subscribers. For example, many customers have experienced a degraded cellular connection by the time an alarm is sent to the NOC regarding an incident occurring in the communication network. While the data collected by the OCS may signal the occurrence of a future incident, this data may not be evaluated in this manner, to detect future incidents before the network and subscribers are significantly impacted. In this way, the OCS is collecting and storing an enormous amount of data that may only be used for monitoring, billing, and charging purposes, but may otherwise not be used to evaluate the state of the resources (e.g., the network elements, such as hardware nodes (e.g., cell sites, routers, etc.), applications, operating systems, data stores, virtual networks, and/or other software artifacts) in the network. Therefore, the communication network may not be using the data collected and maintained by the OCS in an efficient and effective manner, and the lack of use of this data may result in preventable incidents, failures, and faults throughout the network. The incidents, failures, and faults result in degraded network/cellular conditions and disruptions to telecommunications services provided to subscribers.

The present disclosure addresses the foregoing technical problems by providing a technical solution in the technical field of network management. In some embodiments, the data collected by the OCS (e.g., detailing subscriber usage data and performance data describing the behaviors and events occurring across the network elements in the communication network) may be provided to a predictive model over time. This data may be used to train the predictive model to predict anomaly events indicative of a future or pending network incidents. The predictive model may also be used to identify remediation actions that may be performed to resolve the anomaly event and ultimately prevent the incident from occurring in the network. By preventing the incident from occurring in the network, the embodiments disclosed herein improve network conditions and reduce failures across software and hardware network elements in the communication network, thereby increasing network capacity as well.

The term "network element" as used herein may refer to one or more software or hardware resources in the communication network, such as, for example, hardware network elements (e.g., cell sites, routers, etc.) and/or software network elements (e.g., applications, software artifacts, operating systems, data stores, virtual networks, etc.). As used herein, the term "incident" may refer to an unexpected event or failure occurring across one or more network elements in the communication network, causing a degradation of the conditions of the network and/or a disruption in a telecommunication service to a subscriber UE. To this end, one example of an incident may be an error or fault occurring at a network element in the RAN, core network, and/or OCS of the communication network. For example, a RAN incident may include a hardware issue at a cell site (e.g., malfunction antenna or base station) resulting in poor signal quality or complete loss of connectivity, leading to dropped calls or failed data sessions for users in that area. As another example, a core network incident may include an error in the access and mobility management function (AMF) of the core network, which may lead to improper session handovers or mobile management failures, causing calls to drop when users move between cell sites or prevent new data sessions from being established. As yet another example, an OCS incident may include a malfunction in the charging and authentication function (CAF) in the OCS, which may result in latencies in the process of service evaluation and/or enforcement of usage limits.

The term "anomaly event" may refer to a series of one or more events or states, across one or more network elements (e.g., applications, operating systems, and/or hardware network elements in the core network, OCS, and/or RAN of the communication network) that may be indicative of an incident or future incident. The anomaly event may be detected before the disruption of an actual incident occurs (i.e., the anomaly event may indicate a likelihood that a particular incident may occur in the communication network in the future, prior to the incident actually occurring).

In an embodiment, the communication network may include a system for anomaly event detection communicatively coupled to the core network, the OCS, a data store, a RAN, one or more UEs, and a predictive model. The predictive model may be a collection of one or more servers or computer systems communicatively coupled to the system for anomaly event detection. The predictive model may be a computational system (e.g., including both software and hardware components) designed to make predictions or forecasts based on patterns learned from historical data and other data provided as input into the predictive model. As further described herein, the predictive model may predict incidents in the communication network (e.g., at the core network, OCS, and/or RAN) based on the detection of one or more anomaly events. The predictive model may be trained using historical data and anomaly-to-incident mappings.

The historical data may describe all prior incidents that have occurred in the communication network (e.g., across one or more of the RAN, core network, and/or OCS). The historical data may also include subscriber usage data relevant to respective prior incidents and performance data associated with a behavior of network elements in the communication network before the occurrence of the prior incidents. For example, the subscriber usage data may include data records (e.g., call data records (CDRs), usage detail records (UDRs), etc.) that capture the amount of voice, data, messaging, and/or other telecommunication services consumed by UEs. The subscriber usage data may indicate that a usage is impacted by the prior incident because the usage involved a network element affected by the prior incident. The performance data may include metrics and logs that provide insight into the operational health, efficiency, and quality of services delivered to the subscribers, including key performance indicators (KPIs), counters, and logs detailing events at both the application level and infrastructure level. KPIs may include quantifiable metrics used to assess network performance and service quality (e.g., failures, drop rates, throughput, latency, network availability, etc.). Counters may include real-time metrics that track specific events or actions within the network (e.g., number of successful/failed data session setups, active/failed connections, handover attempts, dropped calls, etc.). Application logs may be records generated by the applications at the OCS and core network to capture details of software operations, events, and errors that may help diagnose issues and monitor application/system performance. Infrastructure logs may be records generated by operating systems to capture data from the operating systems, hardware, and physical resources supporting the communication network (e.g., the core network, OCS, and/or RAN), including server performance, memory usage, and hardware failures, essential for monitoring the health and stability of the infrastructure.

As mentioned above, the predictive model may also be trained using the anomaly-to-incident mappings, which may indicate that a predefined pattern of events across one or more of the applications, operating systems, and hardware network elements in the communication network are indicative of a future incident. For example, an anomaly-to-incident mapping may indicate that certain types of data presenting a particular pattern of events (e.g., memory utilization data, result code data, and pod level metrics-included in or derived from the performance data) may be indicative of a failure at an SDP at the OCS, which may ultimately result in subscriber-impacting incidents. As another example, an anomaly-to-incident mapping may present certain types of data indicative of a particular pattern of events (e.g., memory utilization data and CPU utilization data-included in or derived from the performance data) may be indicative of a failure at a CAF and/or SDF at the OCS, which may ultimately result in subscriber-impacting incidents. The foregoing types of data may be captured across the subscriber data and different types of performance data included in the historical data used to train the predictive model.

The predictive model may determine patterns or trends in the data that are indicative of anomaly event (e.g., unusual behaviors across network elements in the communication network before an incident occurs), the root cause of the anomaly event (e.g., the actual issue across one or more layers of related incidents across network elements in the communication network), a network impact of the anomaly event and/or predicted incident (e.g., whether the anomaly event and/or predicted event only impacts a certain cluster of network elements or sectors of subscribers and/or whether the anomaly event and/or predicted event impacts a far broader range of clusters and/or sectors), and an optimal remediation action to resolve the anomaly event before the predicted incident occurs. As such, multiple layers of labeled and unlabeled data (e.g., the historical data and the anomaly-to-incident mappings), and an enormous amount of this data, are being used to train the predictive model to detect anomaly events indicative of future incidents. This vast amount of data collected over time may be used to train the predictive model to identify patterns and terms. For example, during training the algorithm of the predictive model may update the parameters and weights through processes such as gradient descent, adjusting weights and biases based on the input training data to minimize errors in the predictions. The predictive model may then be used to determine anomaly events that predict the occurrence of an incident in the communication network (e.g., in the core network, OCS, and/or RAN), identify a root cause of the anomaly event and a network impact of the anomaly event, and predict an optimal remediation action to resolve the anomaly event before a more severe network description (e.g., an incident) occurs in the communication network.

Once the predictive model has been trained, an anomaly detection application at the system may continuously or intermittently (e.g., based on a predefined schedule) input current network parameters into the predictive model. The current network parameters may include the most recently collected subscriber usage data (e.g., data records based on the current usage of the network elements in the communication network) and performance data (e.g., KPIs, counters, application logs, and/or infrastructure logs describing the most recent behaviors of the network elements in the communication network (e.g., the applications, operating systems, and hardware nodes)).

The predictive model may include a filter application, an anomaly application, a causation and impact application, and/or a remediation application, each of which may be trained differently based on the aforementioned training data (e.g., the historical data and anomaly-to-incident mappings) to make different predictions on behalf of the system for anomaly detection. The filter application may be trained to filter the incoming training data and/or current network parameters prior to the anomaly application detecting an anomaly event based on the current network parameters. For example, the filter application may filter the incoming training data and/or current network parameters based on one or more rules, which may instruct the filter application to remove data that may not be indicative of an anomaly event. For example, a rule may indicate that application logs and/or infrastructure logs received in the current network parameters indicative of a normal or baseline operation of applications/hardware may be filtered out or removed from the current network parameters prior to passing the current network parameters to the anomaly application, because such application logs and/or infrastructure logs may not include information indicative of an anomaly event. The filter application may thus filter the incoming training data and/or current network parameters to obtain filtered training data and/or current network parameters. In some cases, the training data may not be filtered to remove data that may not be indicative of an anomaly event, since such data may be used by the predictive model to learn the baseline performance of the network elements at the communication network. The filter application may then pass the filtered current network parameters to the anomaly application.

The anomaly application may use the training of the predictive model to determine whether the current network parameters indicate one or more anomaly events, providing an early indication that an incident may occur in the future that may disrupt the network performance and impact subscriber UEs. The anomaly detection application may output anomaly event data based on the detected anomaly event. The anomaly event data may indicate at least one of the detected anomaly event (e.g., the seemingly minor error or issue occurring in the communication network), the pattern or trend data identified from the current network parameters that correspond to the detected anomaly event, time data (e.g., time stamps for the sub-events/tasks associated with the anomaly event), location data (e.g., the particular application, operating system, network element, and/or other software or hardware resource affected by the anomaly event), and/or a corresponding predicted future incident.

Once the anomaly application has detected an anomaly event based on the current parameters, the causation and impact application may use the training of the predictive model to identify a root cause of the anomaly event and a network impact of the anomaly event. The root cause of the anomaly event may indicate a source of the anomaly event or the underlying issue giving rise to the anomaly event, and a location of the anomaly event (e.g., the particular application, operating system, network element, and/or other software or hardware resource affected by the anomaly event). For example, the root cause of the anomaly event may be an issue occurring with the programming of one or more related applications, a memory and/or or CPU utilization of one or more related applications, a latency across one or more related applications/network elements, etc. The causation and impact application may output a root cause parameter indicative of the predicted root cause of the anomaly event.

The causation and impact application may also determine the network impact of the anomaly event and/or predicted incident. The network impact may refer to a value or description indicative of the level of experienced disruption or degradation of telecommunication services, such as, for example, geographic area of the anomaly event and/or likely to be impacted by the incident, a quantity of clusters, sectors, users, etc. affected by the anomaly event, a type of the disruption or degradation of telecommunication services (e.g., full outage versus partial outage), a quality of service reduction caused by the disruption or degradation of telecommunication services, etc. The causation and impact application may, for example, determine whether the anomaly event and/or predicted incident is limited to a finite number of network element clusters/application clusters, or subscriber sectors, or whether the anomaly event and/or predicted incident has a far broader impact range potentially many more network element clusters/application clusters, or subscriber sectors. The causation and impact application may also determine whether the anomaly event and/or predicted incident results in more severe outages in higher-congestion/more significant geographic areas, or whether the anomaly event and/or predicted incident results in minor outages in rural geographic areas. The causation and impact application may output a network impact parameter indicative of the predicted network impact of the anomaly event and/or the predicted incident.

Once the causation and impact application has identified the root cause and the network impact based on the detected anomaly event, the remediation application may use the training of the predictive model to predict an optimal remediation action to perform to resolve the anomaly event before a more serious disruption of the network occurs or before the predicted incident occurs. A remediation action may be an automated action performed by the anomaly detection application or an instruction to perform a task (either programmatically or by an operator of the system) to resolve the anomaly event in a timely manner. In some cases, the optimal remediation action may be to display an alert on a dashboard presented on a display of a device operated by a technician of the network. The optimal remediation action, as determined using the trained predictive model, may be based on a history of known, successful remediation actions performed to resolve similar anomaly events in the past. The remediation action may be to modify resources (e.g., applications, operating systems, hardware network elements, and other resources) in the communication network that are used to provide telecommunications services to subscriber UEs. For example, the remediation action may involve automatically re-routing network traffic to bypass faulty nodes, restarting services or applications to remotely clear errors in software network elements, load balancing to redistribute traffic on affected network elements, rolling back software updates, troubleshooting/reconfiguring the resources, dispatching field technicians, etc.

In this way, the application detection application in the system of the communication network may use the different applications (e.g., filter application, anomaly application, causation and impact application, and remediation application) of the predictive model to (1) manipulate the input data of the predictive model to reduce the amount of data used to make predictions at the predictive model, (2) detect anomaly events at the communication system, (3) determine a cause and impact of the anomaly event, and (4) determine an optimal remediation action to perform with respect to the anomaly action. The application detection application may then programmatically perform or instruct performance of the determined remediation action, to essentially prevent incidents from occurring at the communication and ultimately increase network capacity (memory, processing, and communication resources) at the communication network. For example, by preventing incidents in the communication network, the network elements are enabled to continue operating normally, forwarding traffic as expected and providing services to customers as expected. This in turn prevents network elements in the communication network from crashing and prevents customers from experiencing the results of the crashing, such as, for example, dropped calls and access failures.

Turning now to FIG. 1, a communication network 100 is described. The communication network 100 includes a system 102, a core network 103, an online charging system 106 (hereinafter referred to as "OCS 106"), a data store 109, a predictive model system 112, a RAN 115 (including one or more cell sites 118), a network 124, and one or more UEs 128. The network 124 may be one or more private networks, one or more public networks, or a combination thereof. While the system 102, core network 103, OCS 106, data store 109, and predictive model system 112 are shown as separate from the network 124 in FIG. 1, it should be appreciated that the system 102, core network 103, OCS 106, data store 109, and predictive model system 112 may be included as part of the network 124 in various embodiments.

The core network 103 may be the central telecommunications infrastructure responsible for managing and key telecommunications functions and services, such as, for example, call control, data routing, mobility management, and service delivery across the communication network 100. The core network 103 may connect various access networks (e.g., mobile, fixed) to external networks, such as the Internet, and handles tasks, such as authentication, policy enforcement, and quality of service for subscriber UEs 128 using one or more applications 126. The applications 126 may be stored across one or more memories and executable by one or more processors. For example, when the core network 103 supports a 5th Generation (5G) technology standard for cellular networks, the applications 126 may include an access and mobility management function (AMF), a session management function (SMF), a policy control function (PCF), user plane functions (UPFs), unified data management (UDM), etc.

The RAN 115 may connect the subscriber UEs 128 to the core network 103. The RAN may 115 include one or more cell sites 118, base stations, antennas, and other hardware nodes (e.g., routers, switches, bridges, virtual networks, etc.) that manage the transmission and reception of wireless signals. For example, cell sites 118 may refer to a physical location equipped with antennas and other radio equipment that enables wireless communication between UEs 128 and the network 124, RAN 115, and/or core network 103. The cell sites 118 transmit and receive radio signals, providing cellular coverage to a coverage area (e.g., a geographic area around the cell site 118), and connects to the core network 103 through the RAN 115.

The OCS 106 may be a telecommunications system (e.g., a set of servers including a collection of memory, processing, and communication resources) responsible for real-time charging of services, such as voice, data, and messaging services. The OCS 106 may ensure that subscribers are billed accurately based on usage of network elements and resources across the core network 103, OCS 106, and RAN 115. The OCS 106 may include multiple applications 127, which may be stored across one or more memories and executable by one or more processors to monitor and meter usage of network elements across the core network 103, OCS 106, and RAN 115. The network elements may include software artifacts, applications, operation systems, functions, and/or hardware nodes. For example, the applications 127 may include a charging and authentication function (CAF) (e.g., for handling authentication and charging for services to ensure accurate metering and billing of usage), a subscriber data platform (SDP) (e.g., for managing subscriber profiles, preferences, and service entitlements during the charging process), an event mediation module (EMM) (e.g., for collecting, processing, and converting data records from various network elements into a format used for charging), etc.

The UEs 128 may refer to a device, which may be owned and operated by a subscriber of the telecommunications service providing company that operates the core network 103. The UEs 128 may connect to the network 124 via the cell site 118 to access services and communicate with the core network 103 via the RAN 115. Examples of UEs 128 may include smartphones, tablets, laptops, Internet of Things (IoT) devices, or wearable devices.

The system 102 may be a system (e.g., a set of servers including a collection of memory, processing, and communication resources) responsible for detecting anomaly events, determining the root cause and network impact of the anomaly events, and identifying an optimal remediation action to perform to resolve the anomaly event. The system 102 may include an anomaly detection application 121 stored on a memory of the system 102 and executable by a processor of the system 102. As described herein, the anomaly detection application 121 may communicate with the predictive model system 112 to perform the methods described herein.

Figure 3:
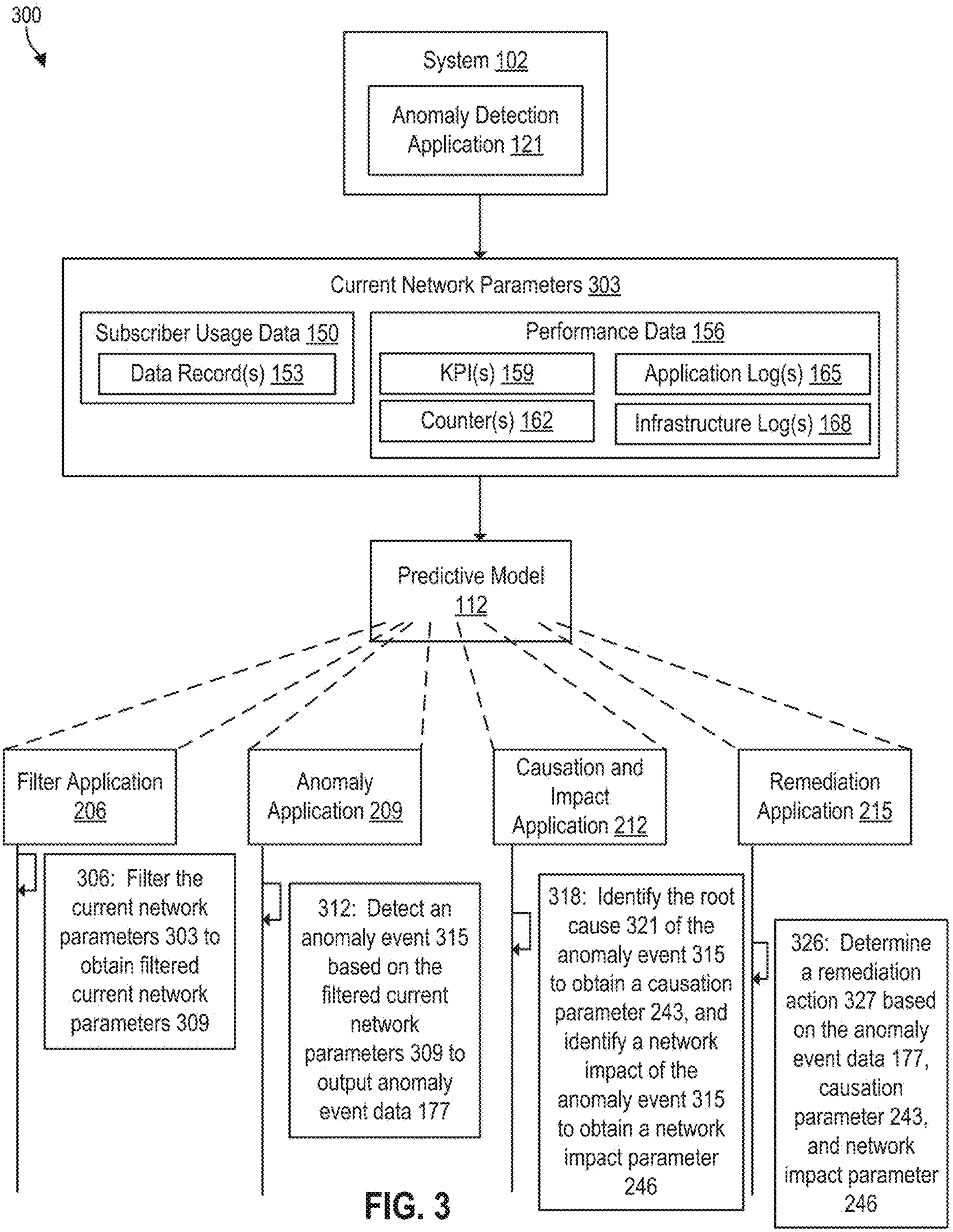
FIG. 3 is a diagram illustrating the use of the different applications in the predictive model to predict an anomaly event occurring in the communication network of FIG. 1 according to various embodiments of the disclosure.

The predictive model system 112 may be implemented as a server or computer system, including one or more processors and memories storing instructions associated with a filter application, an anomaly application, a causation and impact application, and a remediation application, as further described herein with reference to FIG. 3. The predictive model system 112 may include a predictive model, or a machine learning model that leverages algorithms and statistical techniques to analyze input features of and identify patterns to detect current anomaly events in the communication network 100. The current anomaly events may be indicative of future incidents that have not yet occurred in the communication network 100, but may be likely to occur within a predefined period of time (e.g., within a few days, within a few hours, etc.).

The predictive model may be implemented using software (e.g., algorithms, logic, and code) stored across one or more memories, and the underlying hardware of the predictive model system 112 may provide the computational resources for execution of the predictive model. The predictive model may be implemented as one or more different types of models using, for example, linear regression, decision trees, support vector machines, neural networks, or ensemble methods. It should be appreciated that any type of predictive model may be used, and the underlying algorithms, computations, and machine learning libraries used by the predictive model should not be limited herein. As described herein, the predictive model may be trained using data stored at the data store 109.

The data store 109 may be a collection of one or more memories (co-located or distributed across different data centers), which are accessible by the system 102, core network 103, OCS 106, and predictive model system 112. The data store 109 may store data collected by the core network 103, OCS 106, and/or RAN 115, and used by the OCS 106 for metering and charging purposes. As shown in FIG. 1, the data store 109 may store subscriber usage data 150, performance data 156, anomaly-to-incident mappings 170, historical data 171, feedback data 174, anomaly event data 177, application dependencies 180, and remediation data 183 (among other types of data).

The subscriber usage data 150 may include data records 153 (e.g., call data records (CDRs), usage detail records (UDRs), etc.) that capture the amount of voice, data, messaging, and/or other telecommunication services consumed by UEs 128. For example, a CDR may include information such as the phone numbers of the caller and recipient, timestamp data of call start and end times, call status (whether the call was completed, dropped, or failed), cell site information, etc. A UDR may include session start and end times specifying the duration of a data session, a data volume or amount of data uploaded and downloaded during the session, session type and protocol, status of the session (whether the session was completed, dropped, failed, QoS provided, etc.), subscriber identifier of the user, etc.

The performance data 156 may include metrics and logs that provide insight into the operational health, efficiency, and quality of services delivered to the subscriber UEs 128. The performance data 156 may include KPIs 159, counters 162, application logs 165, and infrastructure logs 168 (among other types of logs). KPIs 159 may include quantifiable metrics used to assess network performance and service quality of various applications, operating systems, and hardware network elements/resources in the communication network 100 (e.g., failures, drop rates, throughput, latency, network availability, etc.). Counters 162 may include real-time metrics that track specific events or actions taken by various applications, operating systems, and hardware network elements/resources in the communication network 100 (e.g., number of successful/failed data session setups, active/failed connections, handover attempts, dropped calls, etc.). Application logs 165 may be records generated by the applications 126 at the core network 103 and applications 127 at the OCS 106 capturing details of software operations, events, and errors that may help diagnose issues and monitor application/system performance. Infrastructure logs 168 may be records capturing data from the operating systems, hardware, and physical resources supporting the core network 103, OCS 106, and RAN 115 in the communication network 100, including server performance, memory usage, and hardware failures, essential for monitoring the health and stability of the infrastructure.

Anomaly-to-incident mappings 170 may indicate predefined patterns of events across one or more of the applications, operating systems, and hardware resources/network elements in the communication network 100, which are indicative of a future incident that may be likely to occur in the communication network 100. For example, an anomaly-to-incident mapping 170 may indicate that certain types of data indicative of a particular pattern of events (e.g., memory utilization data, result code data, and pod level metrics—included in or derived from the performance data 156) may be indicative of a failure at an SDP at the OCS 106, which may ultimately result in subscriber-impacting incidents. As another example, an anomaly-to-incident mapping 170 may indicate that certain types of data indicative of a particular pattern of events (e.g., memory utilization data and CPU utilization data—included in or derived from the performance data) may be indicative of a failure at a CAF and/or SDF at the OCS 106, which may ultimately result in subscriber-impacting incidents.

As an illustrative example, an anomaly-to-incident mapping 170 may indicate a pattern of performance data 156 related to the CAF and SDP applications 127 at the OCS 106 maps to a known anomaly event, related to system hardware resource utilization (memory, CPU, disk storage arrays etc.). For example, a spike in memory or CPU utilization without a corresponding spike in traffic levels in the communication system may be considered an anomaly event. As another illustrative example, an anomaly-to-incident mapping 170 may indicate a pattern of performance data 156 related to a performance management function (PMF) in applications 126, 127 and/or result codes indicating a processing result and/or reason of success/failure of a transaction/request from applications 126, 127, each of which may map to a known anomaly event.

The historical data 171 may be data describing all prior incidents that have occurred in the communication network 100 (e.g., across one or more of the RAN 115, core network 103, and/or OCS 106). For example, the historical data 171 may have data describing each of the prior incidents (e.g., the disruption at the network, the location of the incident, the time of the incident, the impact of the incident, etc.), and corresponding subscriber usage data 150 and performance data 156 that may be related to each of the prior incidents. For example, suppose a prior incident is a failure at a policy application (e.g., application 126) in the core network 103, then the historical data 171 may describe the policy application failure, data records 153 associated with the use of the policy application, KPIs 159 associated with the policy application and related applications (as indicated in the application dependencies 180), counters 162 associated with the policy application and related applications, application logs 165 associated with the policy application and related applications, and infrastructure logs 168 associated with the policy application and related applications.

The feedback data 174 refers to the feedback information generated by the anomaly detection application 121 indicating whether the predictions made by the prediction model system 112 were correct or incorrect (e.g., whether the anomaly event correctly or incorrectly indicated an impending incident, whether a causation parameter correctly or incorrectly identified the causation of the anomaly event, whether an impact parameter correctly or incorrectly defined the network impact of the anomaly event and/or impending incident, and/or whether a remediation parameter identified a remediation action that successfully resolved the anomaly event or failed at resolving the remediation event). The anomaly detection application 121 may input the feedback data 174 into the predictive model system 112 to re-train the predictive model to adjust internal parameters based on the feedback data 174, to reduce errors and improve accuracy. This process may ensure that the predictive model continuously learns and refines predictions as more feedback data 174 is fed into the predictive model.

The anomaly event data 177 may refer to a description of the predicted anomaly event as predicted by the anomaly detection application 121 using the predictive model system 112. For example, the anomaly event data 177 may describe at least one of the detected anomaly event (e.g., the events or conditions detected across the network elements), the pattern or trend data identified from current network parameters that correspond to the detected anomaly event, time data (e.g., time stamps for the sub-events/tasks associated with the anomaly event), location data (e.g., the particular network element-application, operating system, network element, and/or other software or hardware resource-affected by the anomaly event), and/or a corresponding predicted future incident.

The application dependencies 180 may refer to the inter-connected relationships between the applications 127 of the OCS 106 and/or the applications 126 in the core network 103 (and other network functions), such that performance across one of the applications 126, 127 relies on the proper functioning of another application 126, 127. For example, an application dependency 180 may indicate that the proper functioning of session management function (SMF) in the core network 103 is related to the CAF at the OCS 106 because a failure at the SMF can create cascading failures across many other applications 126, 127, including the CAF.

The remediation data 183 be a repository of the types of remediation actions that the anomaly detection application 121 may instruct, which may be based on various factors and/or rules. For example, a rule may indicate that certain types of anomaly events are to be resolved with predefined remediation actions, and the predefined remediation actions may be based on the remediation data 183.

In some embodiments, a remediation action may be an automated action performed by the anomaly detection application 121 or an instruction to perform a task (either programmatically or by an operator of the system) to resolve the anomaly event in a timely manner. The optimal remediation action, as determined using the trained predictive model, may be based on a history of known, successful remediation actions performed to resolve similar anomaly events in the past. For example, the optimal remediation action may be to display an alert on a dashboard presented on a display of a device operated by a technician (e.g., operable to manage the network elements impacted by the anomaly event). As another example, the remediation action may be to modify resources (e.g., applications, operating systems, hardware networking elements, and other resources) in the communication network that are used to provide telecommunications services to subscriber UEs. As yet another example, the remediation action may involve automatically re-routing network traffic to bypass faulty network elements, restarting services or applications to remotely clear errors in software components, load balancing to redistribute traffic on affected network elements, rolling back software updates, troubleshooting/reconfiguring the network elements, dispatching field technicians, etc. The remediation data 183 may include the programming instructions and rules for the anomaly detection application 121 to perform based on a determination of the predictive model system 112.

While the system 102, OCS 106, core network 103, predictive model system 112, and data store 109 are shown in FIG. 1 as being separate from one another, one or more of the system 102, OCS 106, core network, predictive model system 112, and data store 109 may be physically or logically together across a single (co-located or distributed) set of servers. For example, the OCS 106 and the system 102 may be part of the core network 103, the OCS 106 may include the system 102, and/or the data store 109 may be stored with the system 102.

Figure 2:
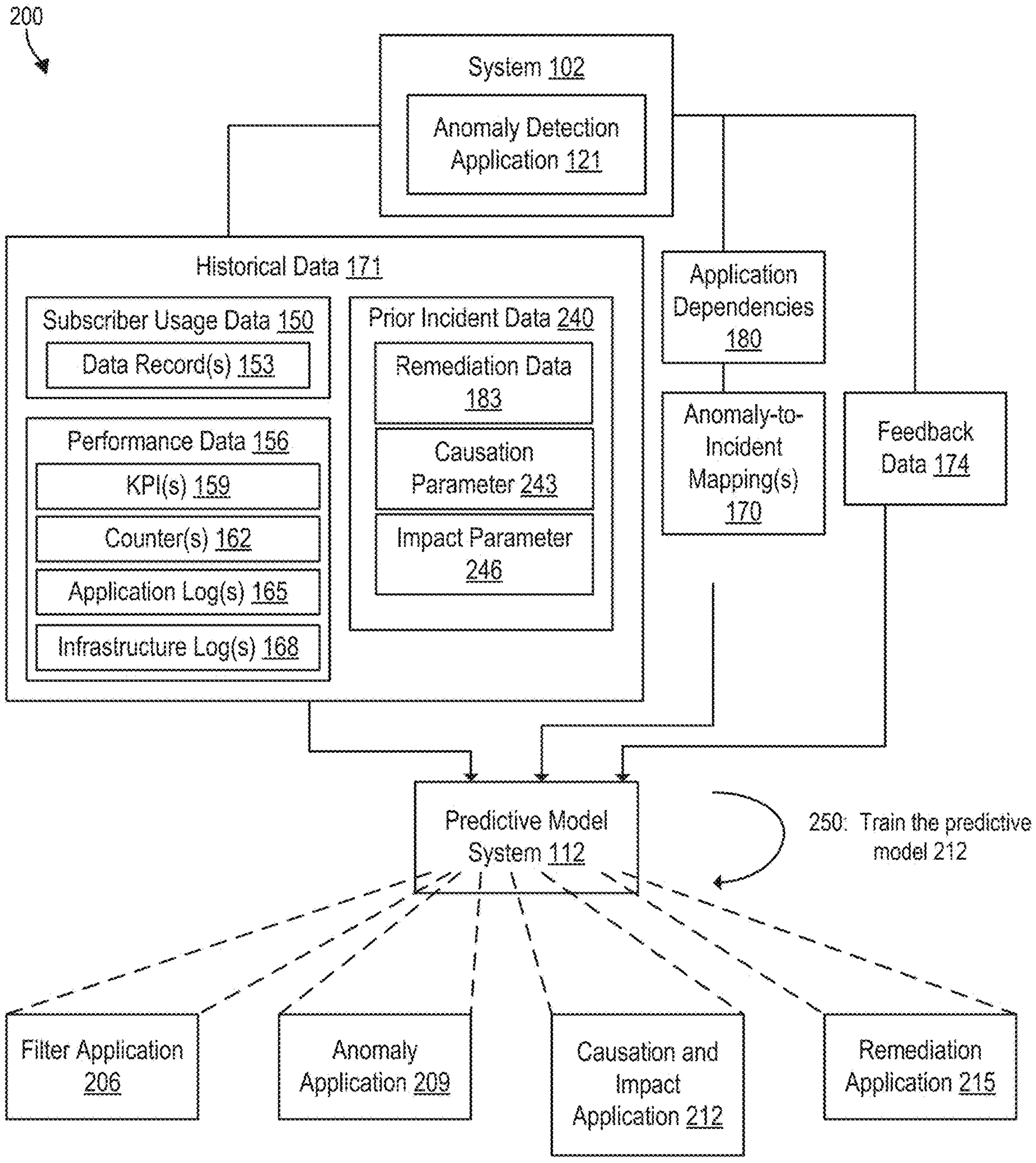
FIG. 2 is a diagram illustrating the training of a predictive model in the communication network of FIG. 1 according to various embodiments of the disclosure.

Referring now to FIG. 2, shown is a diagram illustrating the training of the predictive model system 112 according to various embodiments of the disclosure. As shown in FIG. 2 and described above, the predictive model system 112 includes a filter application 206, anomaly application 209, causation and impact application 212, and remediation application 215.

The anomaly detection application 121 of the system 102 may obtain training data that may be used to train the predictive model system 112, or more specifically, train the filter application 206, anomaly application 209, causation and impact application 212, and remediation application 215 of the predictive model system 112. The training data that is provided as input into the predictive model system 112 may include the historical data 171, the application dependencies 180, anomaly-to-incident mappings 170, and feedback data 174.

The historical data 171 may include prior incident data 240 describing each of the prior incidents that have occurred in the communication network 100. The prior incident data 240 may describe the disruption or failure of the incident occurring in the communication network 100, and for example, may identify application(s), operating system(s), or hardware resource/network element(s) at which the incident occurred. The prior incident data 240 may also include a causation parameter 243 describing the root cause of each of the prior incidents (describing the underlying issue giving rise to the prior incident, a source location of the underlying issue (e.g., the network element at which the underlying issue occurred), etc.). The prior incident data 240 may also include a network impact parameter 246 defining a network impact and subscriber UE impact of the incident. The prior incident data 240 may also include remediation data 183 describing successful and/or unsuccessful remediation actions taken to resolve the faults and failures in the communication network 100 caused by the incident.

The historical data 171 may also include the subscriber usage data 150 and performance data 156 associated with each of the prior incidents that occurred in the communication network 100. The subscriber usage data 150 may include the data records 153 describing a subscriber use of network elements affected by the incident. The performance data 156 may describe the behavior (e.g., actions performed, states, attributes, etc.) of various network elements in the communication network 100 around a time (or within a predefined time period from) of the incident. The performance data 156 may include KPIs 159, counters 162, application logs 165, and infrastructure logs 168 detailing the behavior of the network elements—e.g., applications, operating systems, hardware nodes—in the communication network 100 around a time of (or within a predefined time period from) the incident.

The predefined anomaly-to-incident mappings 170 and predefined application dependencies 180 may also be provided to the predictive model system 112 to further train the predictive model of the predictive model system 112. The anomaly-to-incident mappings 170 may explicitly indicate events across one or more of the network elements in the communication network 100 are indicative of a future incident. The application dependencies 180 may be used to determine the root cause of and a network impact of an anomaly event and/or incident (e.g., a failure at one application 126 at the core network 103 may cascade to issues arising at applications 126 in the OCS 106 and even to the RAN 115). The feedback data 174 may also be provided to the predictive model system 112 to periodically re-train the algorithms and parameters of the predictive model to improve predictions made by the predictive model.

At operation 250, the algorithms, weights, and other parameters of the predictive model at the predictive model system 112 may be trained based on the training data (e.g., the historical data 171, application dependencies 180, anomaly-to-incident mappings 170, and feedback data 174) provided as input into the predictive model system 112. In particular, each of the filter application 206, anomaly application 209, causation and impact application 212, and remediation application 215 may be programmatically trained based on the relevant training data.

For example, the filter application 206 may be trained to determine the types of data most relevant and/or irrelevant to a determination of whether an anomaly event is occurring in the communication network 100. For example, the filter application 206 may be trained to filter out or remove certain types of performance data 156 and data records 153 that are completely irrelevant or unhelpful in the evaluation of current network parameters in determining whether an anomaly event is occurring in the communication network 100.

The anomaly application 209 may be trained model to receive current network parameters (including current subscriber usage data 150 and current performance data 156) and detect whether an anomaly event indicative of a future incident is currently occurring in the communication network 100. The goal of identifying an anomaly event may be to prevent the future incident from occurring and prevent any disruptions in the functioning of the communication network 100.

The causation and impact application 212 may be trained to use the current network parameters and the data describing a detected anomaly event to determine a root cause of the anomaly event and to determine a network impact of the anomaly event. The root cause of the anomaly event may indicate a type of error or issue occurring at the location of the anomaly event (e.g., the particular application, operating system, network element, and/or other software or hardware resource affected by the anomaly event). For example, the root cause of the anomaly event may be an issue occurring with the programming of one or more related applications (as indicated in the application dependencies 180), a memory and/or or CPU utilization of one or more related applications, a latency across one or more related applications/network elements, etc. The causation and impact application 212 may output a root cause parameter indicative of the predicted root cause of the anomaly event.

The network impact may refer to a level of experienced disruption or degradation of telecommunication services, such as, for example, a geographic area of the anomaly event and/or likely to be impacted by the incident, a quantity of network elements and/or customers impacted by the anomaly event and/or likely to be impacted by the incident, a type of the disruption or degradation of telecommunication services (e.g., full outage versus partial outage), a quality of service reduction caused by the anomaly event and/or likely to be caused by the incident, etc. The causation and impact application 212 may, for example, determine whether the anomaly event and/or predicted incident is limited to a finite number of network element clusters/application clusters, or subscriber sectors, or whether the anomaly event and/or predicted incident has a far broader impact range affecting many more network element clusters/application clusters, or subscriber sectors. The causation and impact application 212 may also determine whether the anomaly event and/or predicted incident results in more severe outages in higher-congestion/more significant geographic areas, and/or whether the anomaly event and/or predicted incident results in more minor outages in rural geographic areas. The causation and impact application 212 may output a network impact parameter indicative of the predicted network impact of the anomaly event and/or the predicted incident.

The causation and impact application 212 may be trained to use the current network parameters, the data describing a detected anomaly event, the causation parameter, and the network impact parameter to predict an optimal remediation action to perform to resolve the anomaly event before a more serious disruption of the network occurs or before the future incident occurs. For example, the remediation action may be based on remediation data 183 indicating prior remediation actions that successfully resolved similar anomaly events and/or prior incidents.

Referring now to FIG. 3, shown is a diagram 300 illustrating the use of the different applications in the predictive model system 112 to predict an anomaly event according to various embodiments of the disclosure. The anomaly detection application 121 at the system 102 gathers current network parameters 303, describing current data associated with the current behaviors of the network elements—applications, operating systems, hardware resources/network elements, and/or other software/hardware resources—in the communication network 100.

As shown in FIG. 3, the current network parameters 303 may include current subscriber usage data 150 including data records 153 indicating the usage of network elements in the communication network 100 while providing telecommunications services to the UEs 128, and current performance data 156 describing the behaviors of the network elements at the communication network 100 while providing telecommunications services to the UEs 128. The current performance data 156 may include, for example, current KPIs 159, counters 162, application logs 165, and infrastructure logs 168 related to the current behaviors of network elements in the communication network 100. The current network parameters 303 may include the current subscriber usage data 150 and the performance data 156 collected over a predefined period of time (e.g., a most recent predefined period of time).

The anomaly detection application 121 may first use the filter application 206 of the predictive model system 112 to perform operation 306, to filter the current network parameters 303 (and remove unrelated or unnecessary items of data from the subscriber usage data 150 and the performance data 156 in the current network parameters 303) and obtain filtered current network parameters 309. For example, the anomaly detection application 121 may filter out certain application logs 165 and infrastructure logs 168 that the trained filter application 206 determined does not affect the evaluation of whether an anomaly event 315 is occurring in the communication network 100.

The anomaly detection application 121 may use the anomaly application 209 to perform operation 312, to detect an anomaly event 315 based on the filtered current network parameters 309 to output anomaly event data 177. Again, the trained anomaly application 209 may detect anomaly events 315, which may indicate one or more events or states, across one or more network elements in the communication network. Once the anomaly event 315 has been detected, the causation and impact application 212 may perform operation 318.

At operation 318, the causation and impact application 212 may identify the root cause 321 of the anomaly event 315 to obtain a causation parameter 243 describing the root cause 321 of the anomaly event 315. The root cause 321 of the anomaly event 315 may refer to the underlying issue or fault that triggered the unusual behavior/states of the anomaly event 315. In some cases, the anomaly event 315 may present across one or more applications 126, 127, but the root cause 321 of the anomaly event 315 may initially manifest at another software application or hardware node in the communication network 100. In this way, the root cause 321 of the anomaly event 315 may indicate the primary source of the failure identified in the anomaly event 315. The causation parameter 243 may include an identification/location of the source of the underlying issue at which the anomaly event 315 originated, a description of the underlying issue, and/or a description of a reason behind the underlying issue. In some cases, the root cause 321 of the anomaly event 315 may indicate the occurrence of other related anomaly events 315 that may or may not have been detected by the system 102, and may each impact another set of network elements, clusters, and/or sectors of customers.

At operation 318, the causation and impact application 212 may also identify a network impact of the anomaly event 315 to obtain a network impact parameter 246. The network impact may refer to a level or extent of network/subscriber disruption caused by the anomaly event 315 (e.g., the disruption or degradation in service quality, availability, or performance experienced by applications, operation systems, hardware network elements/resources as a result of the anomaly event 315). The network impact parameter 246 may include, for example, a value or a description of the level of network/subscriber impact of the anomaly event 315.

The anomaly detection application 121 may use the remediation application 215 to perform operation 326, to determine a remediation action 327 based on the anomaly event data 177, the causation parameter 243, and the network impact parameter 246. For example, the remediation application 215 may be trained using historical remediation data 183 indicating successful remediation actions performed in response to similar types of anomaly events 315 (in which the similar anomaly events 315 may be defined based on similar anomaly event data 177, causation parameters 243, and network impact parameters 245). The remediation application 215 may use this training to determine an optimal remediation action 327 to perform in an attempt to resolve the anomaly event 315 and prevent the predicted incident from occurring.

The anomaly detection application 121 may store the anomaly event data 177, the causation parameter 243, network impact parameter 246, and a description of the determined remediation action 327 in the data store 109. The anomaly detection application 121 may then instruct performance of the determined remediation action 327, and either generate or receive a log indicative of whether the remediation action 327 successfully resolved the anomaly event 315 and prevented the future incident or not. The log may be input back into the predictive model system 112 as feedback data 174 to re-train predict model (e.g., update the parameters, algorithms, and/or weights of the predictive model).

In this way, the anomaly detection system 121 may detect patterns based on different types of input data to identify an anomaly occurring in the network upstream of the NOC. As a first example, the input data may include memory utilization, result code, and pod level metrics, and this input data may be received from, for example, PMF files generated from the platform for memory utilization, and a result code-diameter result codes from SDP. The anomaly detection application 121 may use this input data to identify an anomaly of SDP node failure outlier detection. The determined remediation action 327 may be a detection of an outlier if there is failure in any of the SDP nodes due to increase in the memory/CPU utilization.

As a second example, the input data may include result codes that are part of a performance metric, and this input data may be received from, for example, PMF files generated from the platform. The anomaly detection application 121 may use this input data to identify an anomaly of CAF result code outlier detection. The determined remediation action 327 may be to use the predictive model system 112 to perform anomaly detection with regard to result code, to detect the threshold anomalies, and determine whether there are any issues in 5G, 4G, RO and message provisioning.

As a third example, the input data may include memory utilization and CPU utilization metrics, and this input data may be received from, for example, PMF files generated from the platform. The anomaly detection application 121 may use this input data to identify an anomaly at the CAF and SDP. The determined remediation action 327 may be to detect a spike in memory/CPU utilization for the same subscriber count (e.g., since the expectation that the memory and CPU utilization should not spike when the user traffic is low). Other examples of data inputs, received from a variety of different data sources collected by the online charging system 106, may include, for example, HTTP Stats files, AIR-IP Stat files, AF-router State files, var/log/warn file, RPC AccountFinderClient-If stat, Snapshot Reports, PPAS Stats, CIP-IP Diameter Stats, Diameter counters, traffic counters, SBI counters, event counters (CIL, EDM) in CAF/SDP, and TT Logs. Other examples of anomalies, detected by the anomaly detection application 121 based on the data inputs, may include, for example, latencies in provisioning responses (e.g., based on SDP-AIR, AF-CAF, AIR-AF data inputs), provisioning failures (e.g., based on AIR-SDP), AF rejections/AF sync errors (AF-CAF), rejections for provisioning traffic, high rejections indicative of SDP resource overload status, identify service impacts (e.g., based on Diameter results codes and/or SBI result codes from SMF/PCF towards CSA/CAF), NRF registry/discovery control plane anomalies (e.g., based on CAF/CSA metrics), database latencies, pushing of events, database replication, high latencies, etc.

Figure 4:
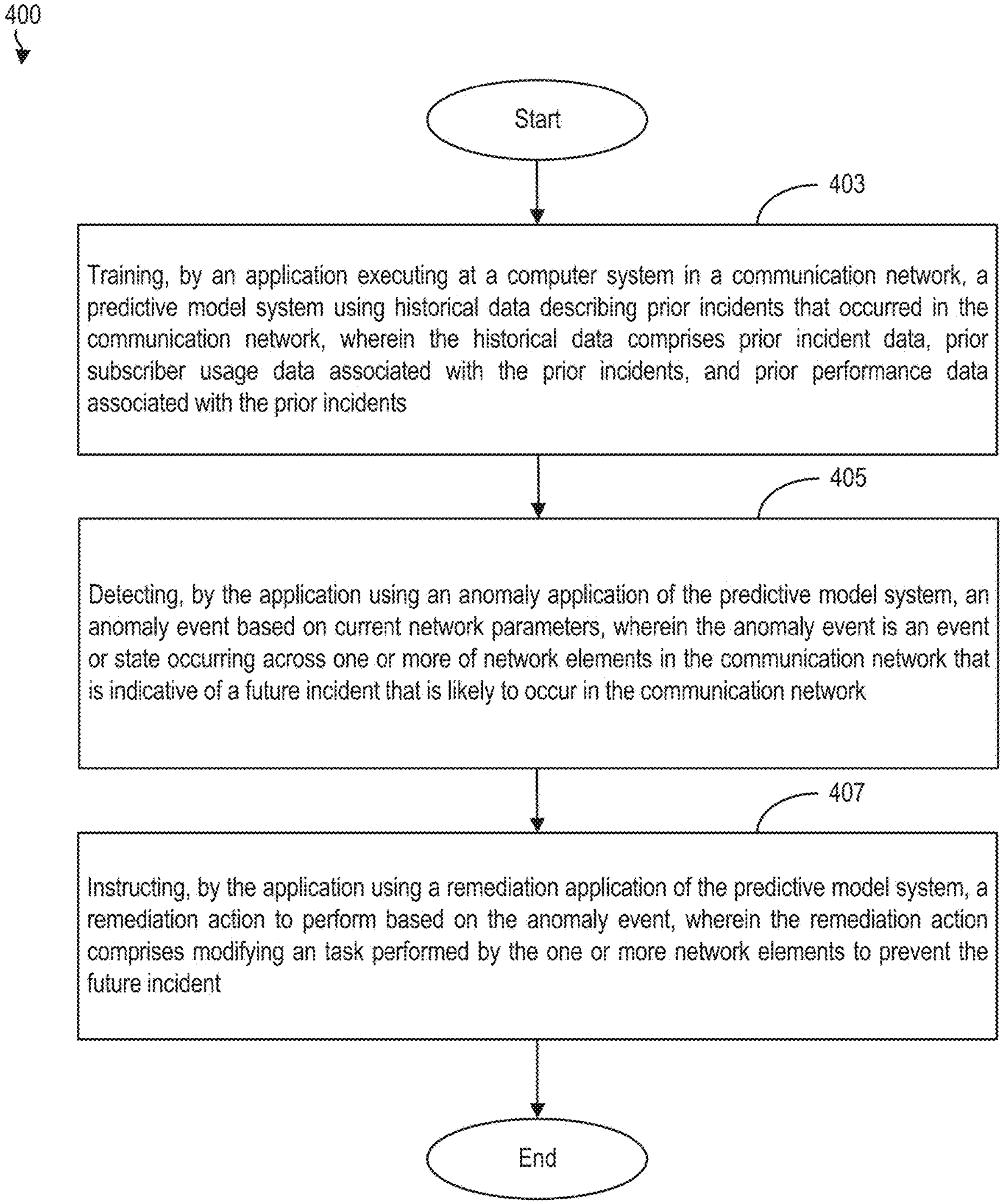
FIG. 4 is a flowchart of a first method of anomaly detection and remediation according to various embodiments of the disclosure.

Referring now to FIG. 4, shown is a method 400 of anomaly detection and remediation in the communication network 100 of FIG. 1 according to various embodiments of the disclosure. Method 400 may be implemented by anomaly detection system 121 in the system 102. In embodiments, the method 400 may be implemented using a computer system with components as shown in FIG. 6. As illustrated, method 400 of FIG. 4 includes a number of enumerated operations, but embodiments of the operations in FIG. 4 may include additional operations before, after, and in between the enumerated operations. In some embodiments, one or more of the enumerated operations may be omitted or performed in a different order.

At step 403, method 400 comprises training, by an application 121 executing at a computer system 102 in a communication network 100, a predictive model system 112 using historical data 171 describing prior incidents that occurred in the communication network 100. The historical data 171 comprising prior incident data 240, prior subscriber usage data 150 associated with the prior incidents, and prior performance data 156 associated with the prior incidents. At step 405, method 400 comprises detecting, by the application 121 using an anomaly application 209 of the predictive model 112, an anomaly event 315 based on current network parameters 303. The anomaly event 315 is an event or state occurring across one or more of network elements (e.g., applications 126 in the core network 103, applications 127 in the OCS 106, hardware network elements in the RAN 115, and/or other software/hardware resources) in the communication network 100 that is indicative of a future incident that is likely to occur in the communication network 100. At step 407, method 400 comprises instructing, by the application 121 using a remediation application 215 of the predictive model system 112, a remediation action 327 to perform based on the anomaly event 315. The remediation action 327 comprises modifying a task performed by the one or more network elements to prevent the future incident.

Method 400 may include other steps and/or features that are not otherwise shown in FIG. 4. In an embodiment, the prior incident data 240 describes a location, a root cause, and a network impact of each of the prior incidents. In an embodiment, the prior subscriber usage data 150 comprises data records 153 describing usage of the one or more network elements that are impacted by each of the prior incidents. In an embodiment, the prior performance data 156 comprises at least one of KPIs 159, counters 162, application logs 165, or infrastructure logs 168 related to the one or more network elements that are impacted by each of the prior incidents.

In an embodiment, modifying the task performed by the one or more network elements comprises automatically rerouting network traffic to bypass the one or more network elements and/or redistributing the network traffic across the one or more network elements. In an embodiment, the remediation action 327 further comprises presenting, on a display associated with the computer system 102, a notification describing the anomaly event 315 in human-readable form (e.g., in plain English text, with a suggestion for an operator of the device to evaluate the performance of the one or more network elements). In an embodiment, method 400 may further comprise determining, by the application 121 using a causation and impact application 212 of the predictive model system 112, a causation parameter 243 describing a root cause of the anomaly event 315, and/or determining, by the application 121 using a causation and impact application 212 of the predictive model system 112, a network impact parameter 246 describing a level of network impact of the anomaly event 315 based on the root cause of the anomaly event 315.

Figure 5:
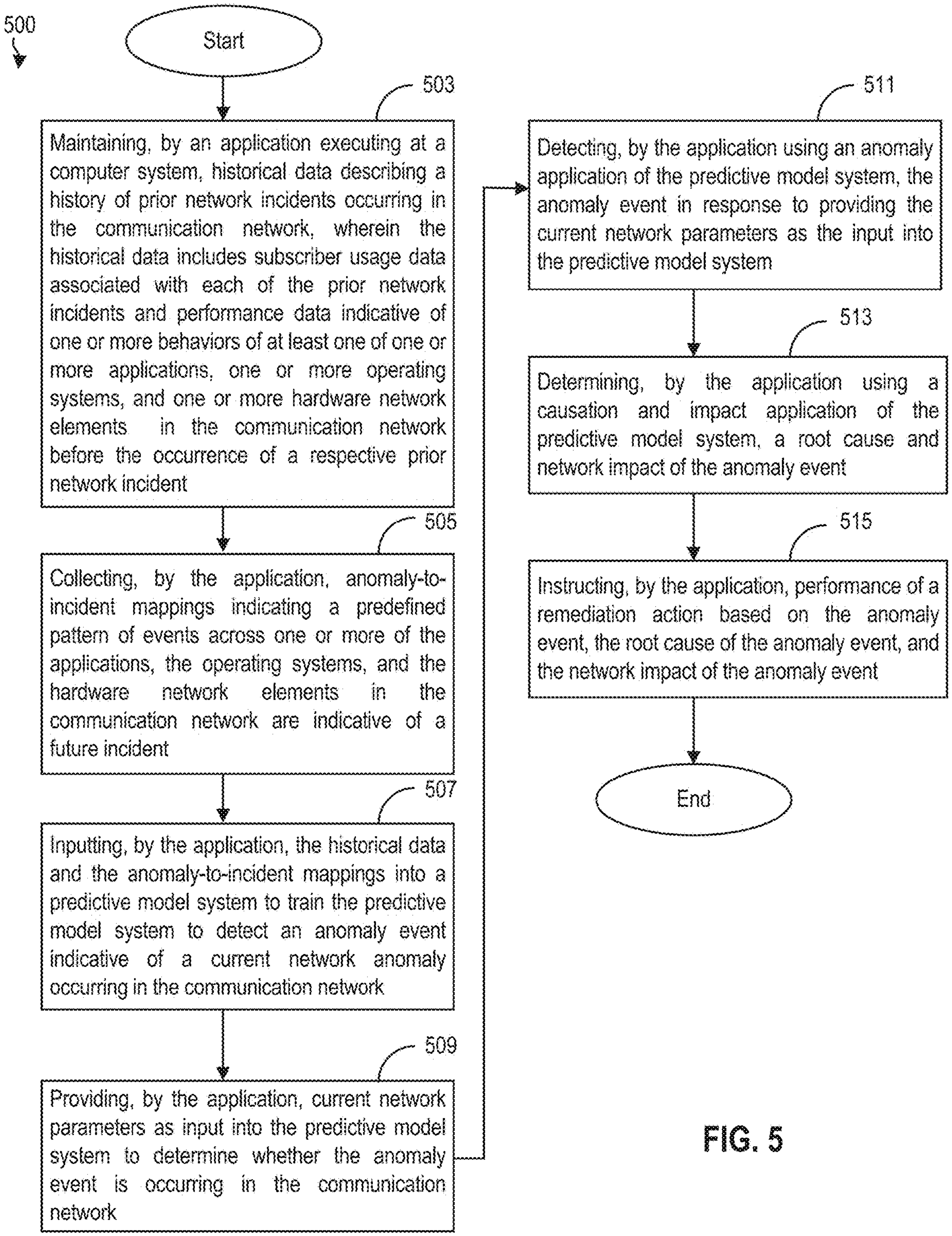
FIG. 5 is a flowchart of a second method of anomaly detection and remediation according to various embodiments of the disclosure.

Referring now to FIG. 5, shown is a method 500 of anomaly detection and remediation in the communication network 100 of FIG. 1 according to various embodiments of the disclosure. Method 500 may be implemented by anomaly detection system 121 in the system 102. In embodiments, the method 500 may be implemented using a computer system with components as shown in FIG. 6. As illustrated, method 500 of FIG. 5 includes a number of enumerated operations, but embodiments of the operations in FIG. 5 may include additional operations before, after, and in between the enumerated operations. In some embodiments, one or more of the enumerated operations may be omitted or performed in a different order.

At step 503, method 500 comprises maintaining, by an anomaly detection application 121 executing at a computer system 102, historical data 171 describing a history of prior network incidents occurring in the communication network 100. The historical data 171 includes subscriber usage data 150 associated with each of the prior network incidents and performance data 156 indicative of one or more behaviors of at least one of one or more applications, one or more operating systems, and one or more hardware network elements in the communication network 100 before the occurrence of a respective prior network incident. At step 505, method 500 comprises collecting, by the anomaly detection application 121, anomaly-to-incident mappings 170 indicating a predefined pattern of events across one or more of the applications, the operating systems, and the hardware network elements in the communication network are indicative of a future incident. At step 507, method 500 comprises inputting, by the anomaly detection application 121, the historical data 171 and the anomaly-to-incident mappings 170 into a predictive model system 112 to train the predictive model system 112 to detect an anomaly event 315 indicative of a current network anomaly occurring in the communication network 100.

At step 509, method 500 comprises providing, by the anomaly detection application 121, current network parameters 303 as input into the predictive model system 112 to determine whether the anomaly event 315 is occurring in the communication network 100. At step 511, method 500 comprises detecting, by the anomaly detection application 121 using an anomaly application 209 of the predictive model system 112, the anomaly event 315 in response to providing the current network parameters 303 as the input into the predictive model system 112. At step 513, method 500 comprises determining, by the anomaly detection application 121 using a causation and impact application 212 of the predictive model system 300, a root cause and network impact of the anomaly event 315. At step 515, method 500 comprises instructing, by the application 121, performance of a remediation action 327 based on the anomaly event 315, the root cause of the anomaly event 315, and the network impact of the anomaly event 315.

Method 500 may include other steps and/or features that are not otherwise shown in FIG. 5. In an embodiment, the current network parameters 303 comprise at least one of KPIs 159, counters 162, infrastructure logs 168, or application logs 165 associated with one or more of the applications 126, 127, the operating systems, or the hardware network elements in the communication network 100. In an embodiment, method 500 may further comprise inputting, by the application 121, application dependencies 180 into the predictive model system 112 to train the predictive model system 112 based on relationships between one or more of the applications 126, 127, the operating systems, or the hardware network elements in the communication network 100.

In an embodiment, method 500 may further comprise inputting, by the application 121, feedback data 174 indicating whether the remediation action 327 was successful in resolving the anomaly event 315 to further train the predictive model system 112. In an embodiment, the root cause of the anomaly event 315 is an underlying issue at a source of the anomaly event 315. In an embodiment, the network impact of the anomaly event 315 is a value or description indicating a level of disruption in the communication network caused by the anomaly event 315.

Figure 6A:
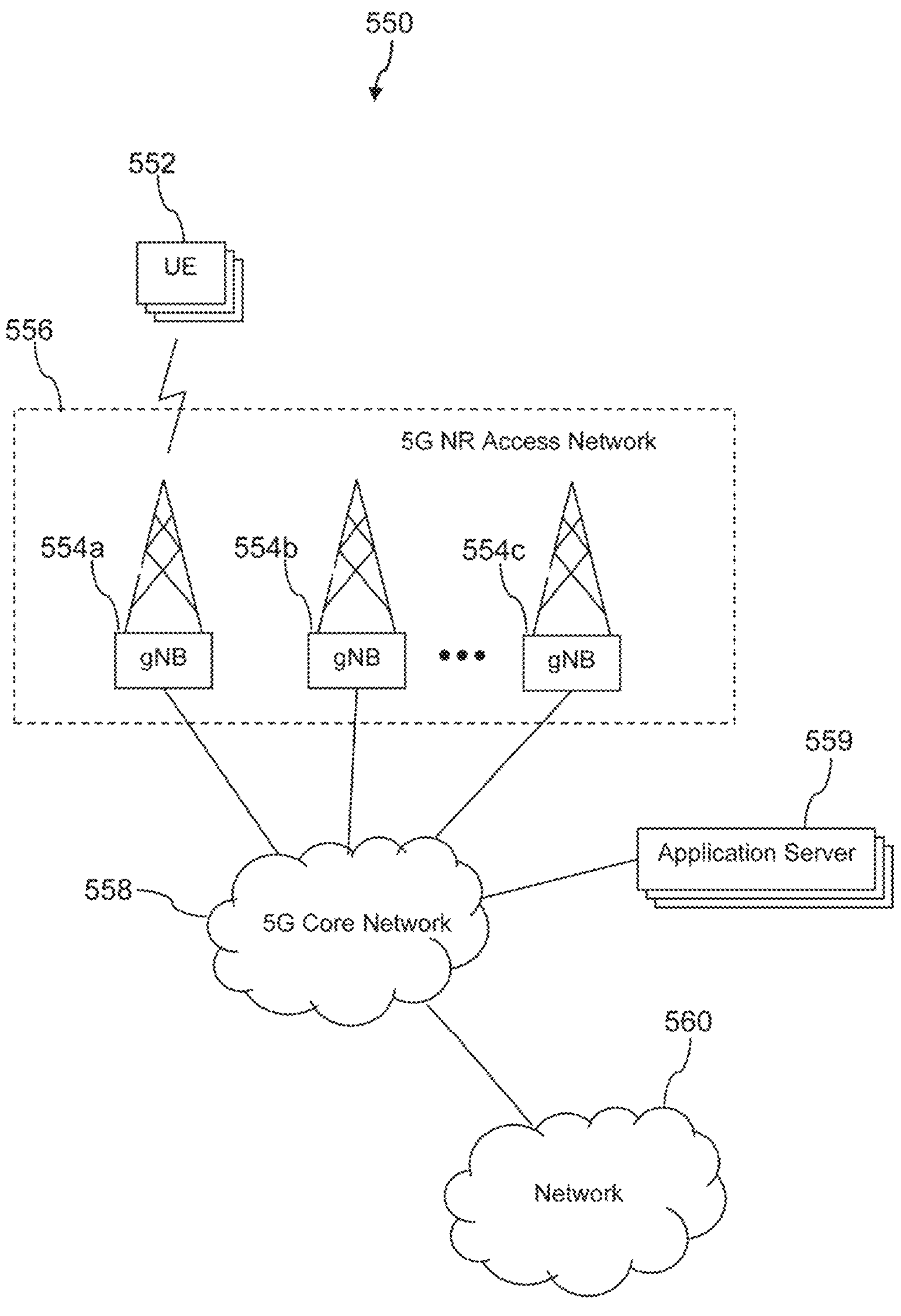
FIGS. 6A-B are block diagrams illustrating a communication system similar to the communication network of FIG. 1 according to an embodiment of the disclosure.

Turning now to FIG. 6A, an exemplary communication system 550 is described. In an embodiment, the communication system 550 may be implemented in the network 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as UEs 128, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
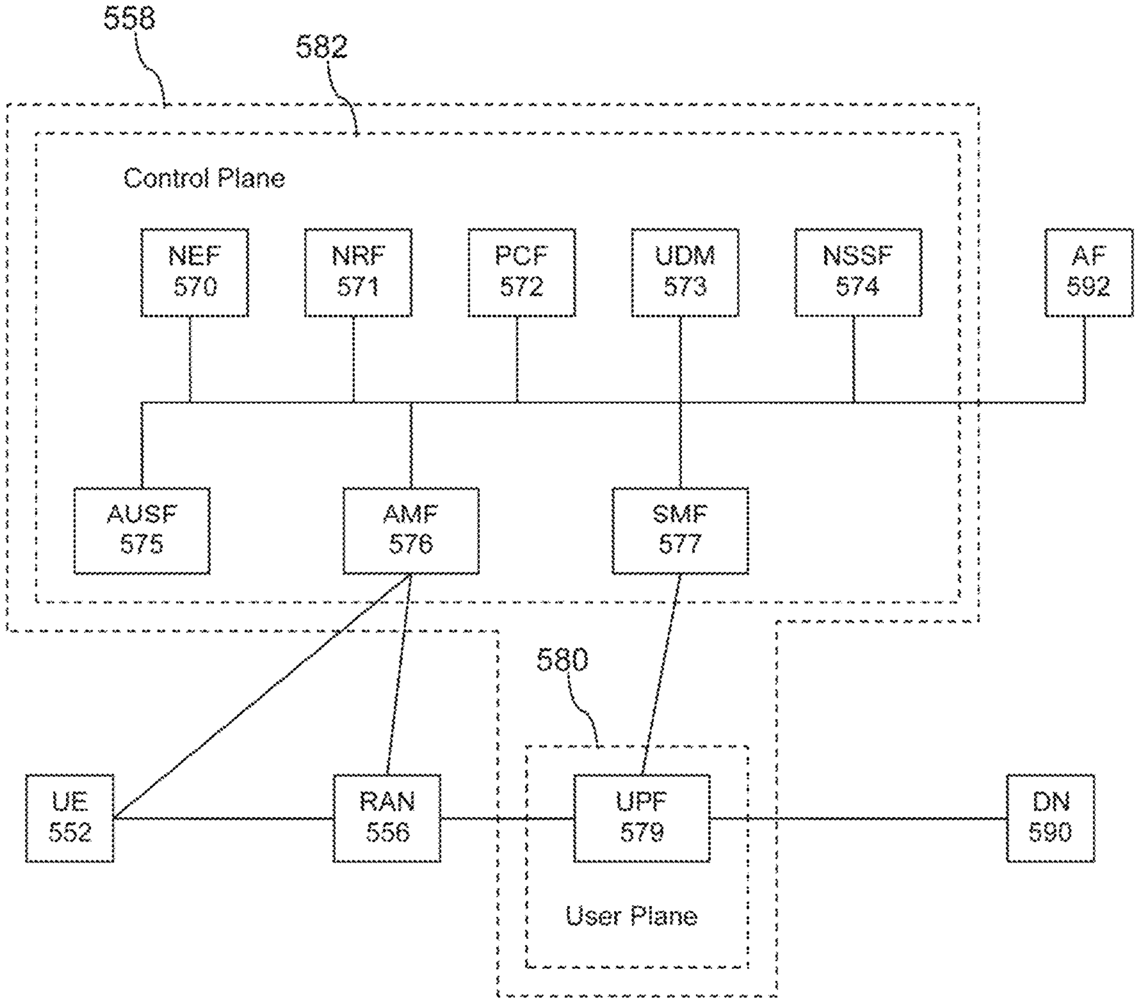

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links to the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
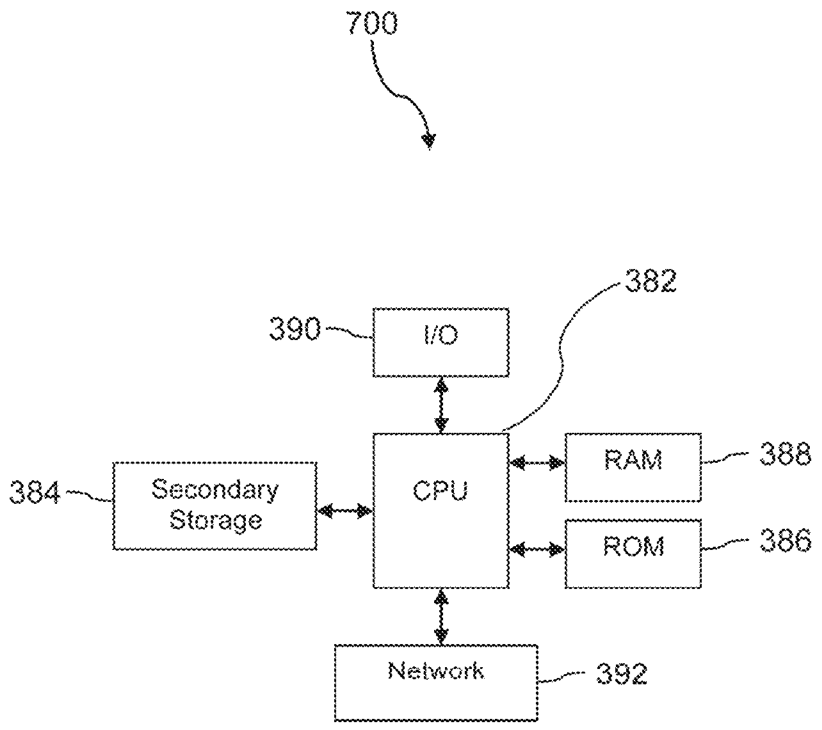
FIG. 7 is a block diagram of a computer system implemented within the communication network of FIG. 1 according to an embodiment of the disclosure.

FIG. 7 illustrates a computer system 700 suitable for implementing one or more embodiments disclosed herein. In an embodiment, the core network 103, OCS 106, system 102, predictive model system 112, and/or UEs 128, etc., may each be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for network anomaly detection and network error prevention in a communication network, wherein the method comprises:

maintaining, by an application executing at a computer system, historical data describing a history of prior network incidents occurring in the communication network, wherein the historical data includes subscriber usage data associated with each of the prior network incidents and performance data indicative of one or more behaviors of at least one of one or more applications, one or more operating systems, and one or more hardware network elements in the communication network before a respective prior network incident;

collecting, by the application, anomaly-to-incident mappings indicating a predefined pattern of events across one or more of the applications, the operating systems, and the hardware network elements in the communication network are indicative of a future incident;

inputting, by the application, the historical data and the anomaly-to-incident mappings into a predictive model system to train the predictive model system to detect an anomaly event indicative of a future incident that is likely to occur in the communication network prior to the future incident occurring;

providing, by the application, current network parameters as input into the predictive model system to determine whether the anomaly event is occurring in the communication network;

detecting, by the application using an anomaly application of the predictive model system, the anomaly event in response to providing the current network parameters as the input into the predictive model system;

determining, by the application using a causation and impact application of the predictive model system, a root cause and network impact of the anomaly event; and instructing, by the application, performance of a remediation action based on the anomaly event, the root cause of the anomaly event, and the network impact of the anomaly event to prevent the future incident from occurring in the communication network.

2. The method of claim 1, wherein the current network parameters comprise at least one of key performance indicators, counters, infrastructure logs, or application logs associated with one or more of the applications, the operating systems, or the hardware network elements in the communication network.

3. The method of claim 1, further comprising inputting, by the application, application dependencies into the predictive model system to train the predictive model system based on relationships between one or more of the applications, the operating systems, or the hardware network elements in the communication network.

4. The method of claim 1, further comprising inputting, by the application, feedback data indicating whether the remediation action was successful in resolving the anomaly event to further train the predictive model system.

5. The method of claim 1, wherein the root cause of the anomaly event is an underlying issue at a source of the anomaly event.

6. The method of claim 1, wherein the network impact of the anomaly event is value or description indicating a level of disruption in the communication network caused by the anomaly event.

7. A system, comprising:

a non-transitory memory configured to:

store current subscriber usage data of telecommunications services provided to subscriber user equipment (UEs) by a core network and an online charging system over a predefined period of time; and store current network parameters describing a behavior or state of at least one of applications, operating systems, or hardware network elements while providing the telecommunications services to the subscriber UEs over the predefined period of time;

a processor communicatively coupled to the memory; and an application stored at the memory, which when executed by the processor, causes the processor to be configured to:

obtain, using an anomaly application of a predictive model system, anomaly event data describing an anomaly event based on the current network parameters and the current subscriber usage data, wherein the anomaly event is a series of states or events occurring across one or more of the applications, the operating systems, or the hardware network elements that is indicative of a future incident that is likely to occur while providing the telecommunications services to the subscriber UEs prior to the future incident occurring;

determine, using a causation and impact application of the predictive model system, a root cause parameter describing a root cause of the anomaly event; and instruct, using a remediation application of the predictive model system, a remediation action to perform based on the anomaly event data and the root cause parameter, wherein the remediation action comprises modifying resources used to provide the telecommunications services to the subscriber UEs to prevent the future incident from occurring.

8. The system of claim 7, wherein the current subscriber usage data comprises one or more data records describing a usage of at least one of the applications, operating systems, or hardware network elements in providing telecommunications services to the subscriber UEs.

9. The system of claim 7, wherein the current network parameters include at least one of current key performance indicators, counters, application logs, or infrastructure logs describing the behavior or state of the at least one of applications, operating systems, or hardware network elements while providing the telecommunications services to the subscriber UEs over the predefined period of time.

10. The system of claim 7, wherein the application is further configured to train the predictive model system using historical data describing prior incidents that occurred in a communication network, wherein the historical data comprises prior incident data, prior subscriber usage data associated with the prior incidents, and prior performance data associated with the prior incidents.

11. The system of claim 7, wherein the application is further configured to filter, using a filter application of the predictive model system, the current network parameters to remove data unrelated to anomaly events to obtain filtered current network parameters.

12. The system of claim 7, wherein the application is further configured to determine, using the causation and impact application of the predictive model system, a network impact parameter describing level of disruption caused by the anomaly event in a communication network.

13. The system of claim 8, wherein to modify the resources used to provide the telecommunications services to the subscriber UEs, network traffic is rerouted to other resources in a communication network to avoid the resources affected by the anomaly event.

14. A method comprising:

training, by an application executing at a computer system in a communication network, a predictive model system using historical data describing prior incidents that occurred in the communication network, wherein the historical data comprises prior incident data, prior subscriber usage data associated with the prior incidents, and prior performance data associated with the prior incidents;

detecting, by the application using an anomaly application of the predictive model system, an anomaly event based on current network parameters, wherein the anomaly event is an event or state occurring across one or more network elements in the communication network that is indicative of a future incident that is likely to occur in the communication network prior to the future incident occurring; and instructing, by the application using a remediation application of the predictive model system, a remediation action to perform based on the anomaly event, wherein the remediation action comprises modifying a task performed by the one or more network elements to prevent the future incident.

15. The method of claim 14, wherein the prior incident data describes a location, a root cause, and a network impact of each of the prior incidents, wherein the prior subscriber usage data comprises data records describing usage of the one or more network elements that are impacted by each of the prior incidents.

16. The method of claim 14, wherein the prior performance data comprises at least one of key performance indicators, counters, application logs, or infrastructure logs related to the one or more network elements that are impacted by each of the prior incidents.

17. The method of claim 14, wherein modifying the task performed by the one or more network elements comprises automatically rerouting network traffic to bypass the one or more network elements or redistributing the network traffic across the one or more network elements.

18. The method of claim 14, wherein the remediation action further comprises presenting, on a display associated with the computer system, a notification describing the anomaly event in human-readable form.

19. The method of claim 14, further comprising determining, by the application using a causation and impact application of the predictive model system, a causation parameter describing a root cause of the anomaly event.

20. The method of claim 14, further comprising determining, by the application using a causation and impact application of the predictive model system, a network impact parameter describing a level of network impact of the anomaly event based on a root cause of the anomaly event.

* * * * *